(12) United States Patent
Lee et al.

(10) Patent No.: US 6,334,258 B1
(45) Date of Patent: Jan. 1, 2002

(54) INSPECTION DEVICE FOR EXAMINING A PIECE OF APERTURE GRAPHITE OF AN EXTRACTION ELECTRODE

(75) Inventors: Chun-chieh Lee, Pao-Shun; Hua-jen Tseng, Chu-Pei; Dong-tay Tsai, Kaohsiung; Yi-hua Chin, Taipei, all of (TW)

(73) Assignee: Mosel Vitelic Inc. (TW)

( * ) Notice: Subject to any disclaimer, the term of this patent is extended or adjusted under 35 U.S.C. 154(b) by 0 days.

(21) Appl. No.: 09/467,877

(22) Filed: Dec. 21, 1999

(30) Foreign Application Priority Data

Aug. 23, 1999 (TW) .......................................... 88114496

(51) Int. Cl.⁷ ............................ G01B 3/20; G01B 1/00; G01B 3/00; G01B 5/00; G01B 5/20
(52) U.S. Cl. ...................... 33/1 V; 33/1 BB; 33/1 C; 33/501.05; 33/545; 33/549; 33/561.1
(58) Field of Search ................... 33/1 BB, 1 C, 33/1 V, 501.05, 501.06, 545, 546, 547, 549, 551, 561.1, 562

(56) References Cited

U.S. PATENT DOCUMENTS

| | | | | |
|---|---|---|---|---|
| 3,823,483 A | * | 7/1974 | Barlett ............................ | 33/57 |
| 4,566,192 A | * | 1/1986 | Hankins et al. ................ | 33/1 B |
| 4,697,346 A | * | 10/1987 | Warburg ..................... | 33/1 BB |
| 5,109,609 A | * | 5/1992 | Anderson ................. | 33/502.05 |
| 6,138,371 A | * | 10/2000 | Lippa et al. ................... | 33/1 V |

* cited by examiner

Primary Examiner—Diego Gutierrez
Assistant Examiner—Yaritza Guadalupe
(74) Attorney, Agent, or Firm—Bacon & Thomas, PLLC

(57) ABSTRACT

An inspection device for examining a piece of aperture graphite of an extraction electrode, and the aperture graphite includes a to-be-examined curve and a to-be-examined engagement portion. The inspection device includes a sidewall surface having a standard curve marked thereon, and an examination engagement portion having a predetermined positional relationship with the sidewall surface. After the to-be-examined engagement portion is engaged with the examination engagement portion, and after the to-be-examined curve is projected onto the sidewall surface, the suitability of the aperture graphite can be determined according to the amount of differences between the projected to-be-examined curve and the standard curve.

4 Claims, 13 Drawing Sheets

INSPECTION DEVICE FOR EXAMINING A PIECE OF APERTURE GRAPHITE OF AN EXTRACTION ELECTRODE

FIELD OF THE INVENTION

The present invention relates to an inspection device for an ion implanter, and in particular, to an inspection device for examining a piece of aperture graphite of an extraction electrode of an ion implanter.

BACKGROUND OF THE INVENTION

Recently, the ion implanting technology has been well developed. The recently available ion implanting technology not only satisfies needs for various semiconductor doping processes, but also becomes the most essential doping technology in the process for fabricating very large semiconductor integrated circuits.

An ion implanter is an apparatus for carrying out the ion implanting technology, including an ion source system for generating ions, a mass analyzer for separating major doped ions, and an accelerator for accelerating the ions to be implanted. The ion source system includes an evaporator, an arc chamber, a magnet, and an extraction electrode. The detailed description of the arc chamber and extraction electrode will be made in the following.

Referring to FIG. 1, plasma 3 is produced by the ion source (not shown) accommodated in an arc chamber 1 having an outlet 11. An extraction electrode 2 includes a suppression electrode 21, a ground electrode 22, and an insulator 23. The suppression electrode 21 includes two suppression electrode plates 211 and two suppression electrode aperture graphite elements 212. The ground electrode 22 includes two ground electrode plates 221 and two ground electrode aperture graphite elements 222. The suppression electrode 21 is provided with a suppression voltage SV, and the ground electrode 22 is grounded.

A suppression electrode aperture 213 is formed between the two suppression electrode plates 211 and between the two suppression electrode aperture graphite elements 212. A ground electrode aperture 223 is formed between the two ground electrode plates 221 and between the two ground electrode aperture graphite elements 222.

The ion beam from the arc chamber 1 is attracted out via the outlet 11 by the extraction electrode 2. The ion beam attracted out passes through the suppression electrode aperture 213 and the ground electrode aperture 223 while being focused for the next treatment.

Referring to FIGS. 2 and 1, the extraction electrode 2 includes a suppression electrode 21 and a ground electrode 22. The suppression electrode 21 includes two suppression electrode plates 211 and two suppression electrode aperture graphite elements 212. The ground electrode 22 includes two ground electrode plates 221 (not shown) and two ground electrode aperture graphite elements 222 (not shown). The construction of the ground electrode 22 and that of the suppression electrode 21 are substantially similar to each other.

Referring to FIG. 3A, each of the suppression electrode aperture graphite elements 212 includes a first to-be-examined curve 2121, two first engagement surfaces 2122, two second engagement surfaces 2123, and a first lower surface 2124. Referring to FIG. 3B, each of the ground electrode aperture graphite elements 222 includes a second to-be-examined curve 2221, two third engagement surfaces 2222, and a second lower surface 2223.

Referring again to FIG. 1, the extraction electrode 2 is used for attracting the ion beam from the arc chamber 1 in order to produce an ion beam current. Then, the ion beam current is focused. The suppression electrode aperture graphite elements 212 and the ground electrode aperture graphite elements 222 are those in contact with the ion beam current.

The curvatures of the arc surfaces of each of the suppression electrode aperture graphite elements 212 and each of the ground electrode aperture graphite elements 222 influence the diffraction of the ion beam current passing through the suppression electrode aperture 213 and the ground electrode aperture 223, and also influence the focusing of the ion beam current. The degrees of the influences can be examined during the tuning process of the ion beam, with reference to the variation of the suppression voltage SV.

In the extraction electrode 2, the suppression electrode aperture graphite elements 212 and the ground electrode aperture graphite elements 222 are considered as consumables. After they are utilized for some time, the first to-be-examined curve 2121 and the second to-be-examined curve 2221 are easily deformed and this can affect the ability of tuning ions of the ion implanter. In this case, the ion beam current does not reach a normal value, and the suppression voltage SV has to be increased in order to increase the focusing ability. According to this method, some electric power is wasted and other elements (not shown) within the extraction electrode 2 can be damaged in a short period of time.

In addition, if the deformation of the arc surface of the ground electrode aperture graphite element 222 and that of the suppression electrode aperture graphite element 212 have to be examined before each operating process, the steps of mounting a plurality of elements, vacuuming, tuning the ion beam, and the like are needed. Thus, a high manufacturing cost will be incurred.

SUMMARY OF THE INVENTION

In accordance with the first aspect of the invention, an inspection device for examining a piece of aperture graphite of an extraction electrode is disclosed. The aperture graphite has a to-be-examined curve and a to-be-examined engagement portion. The inspection device comprises a sidewall surface having a standard curve marked thereon, and an examination engagement portion having a predetermined positional relationship with the sidewall surface while the to-be-examined engagement portion is engaged with the examination engagement portion and the to-be-examined curve is projected onto the sidewall surface. The suitability of the aperture graphite can be determined according to the amount of difference between the projected to-be-examined curve and the standard curve.

The amount of difference between the projected to-be-examined curve and the standard curve comprises area difference that is the difference between the area enclosed by the projected to-be-examined curve and that by the standard curve, and maximum distance difference that is the maximum distance difference between the projected to-be-examined curve and the standard curve.

The aperture graphite is determined as unsuitable when the maximum distance difference is larger than 0.5 mm.

DETAILED DESCRIPTION OF THE PREFERRED EMBODIMENTS

Figure 1:
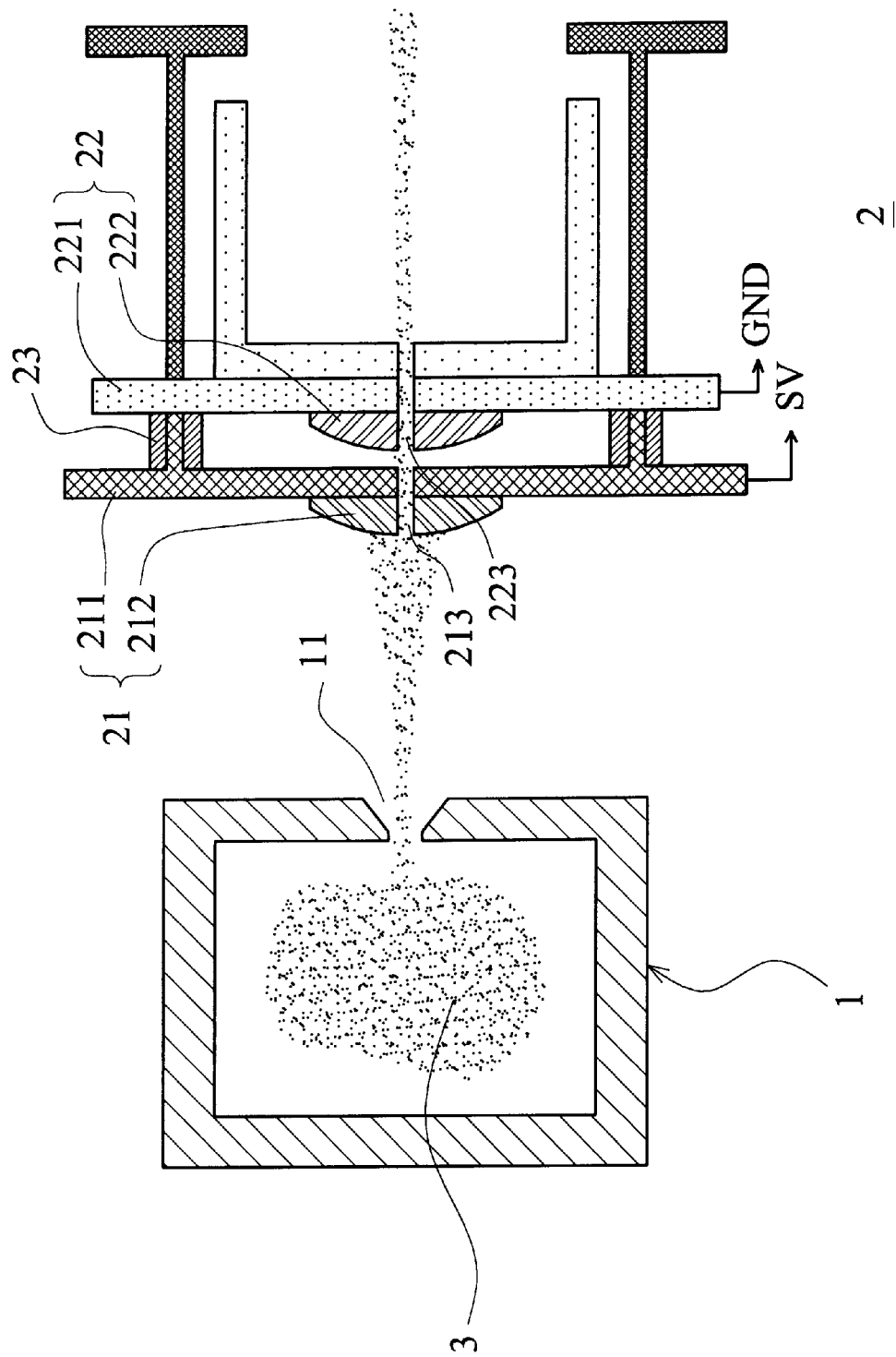
FIG. 1 is a schematic view showing an arc chamber and an extraction electrode.
Figure 2:
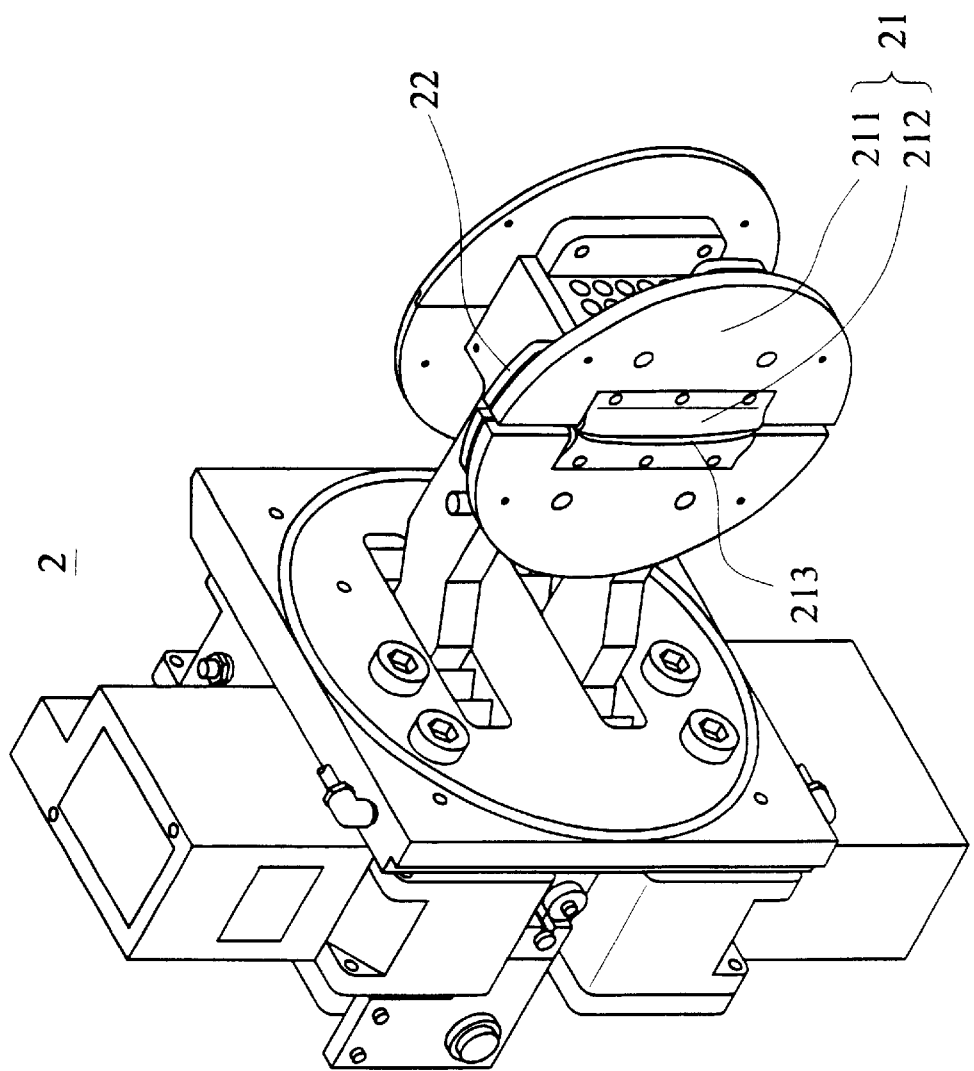
FIG. 2 is a pictorial view of the extraction electrode.
Figures 3A, 3B:
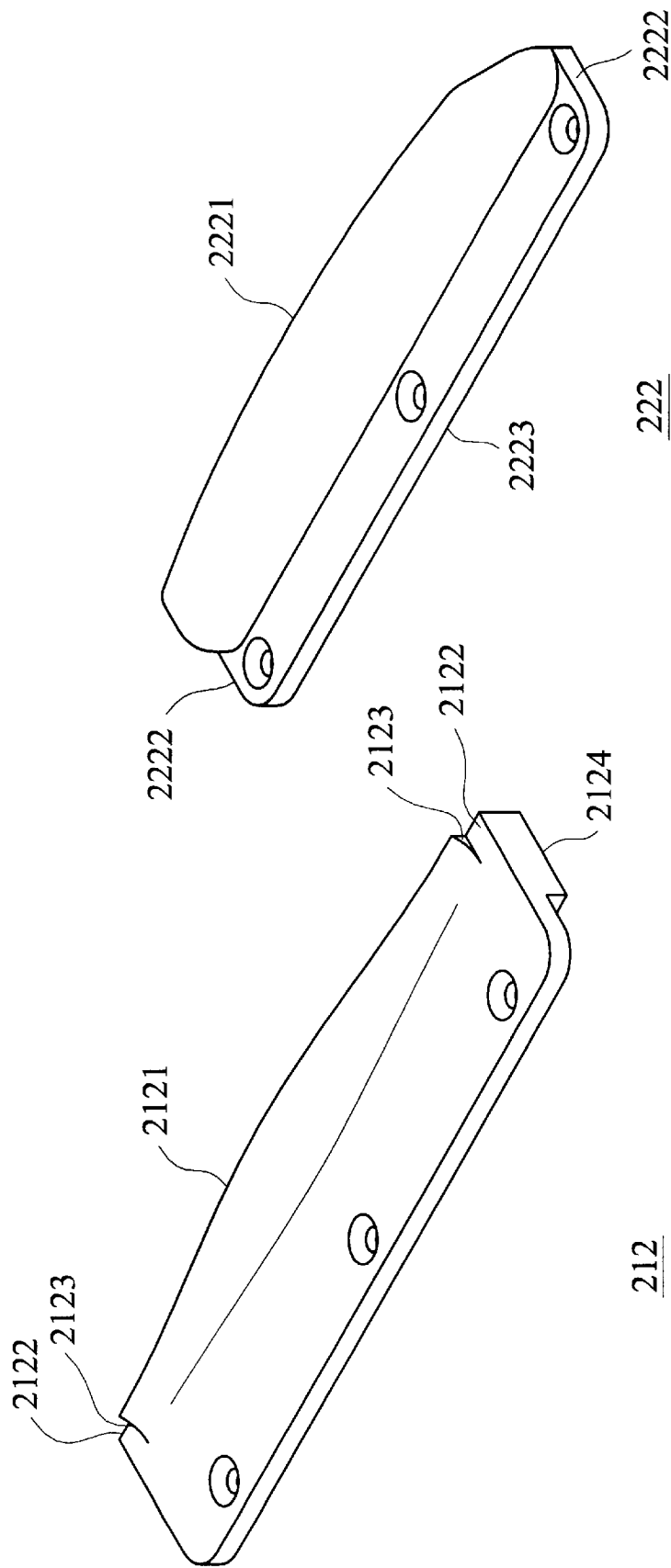
FIGS. 3A and 3B are pictorial views of a suppression electrode aperture graphite element 212 and a ground electrode aperture graphite element 222.
Figure 4A:
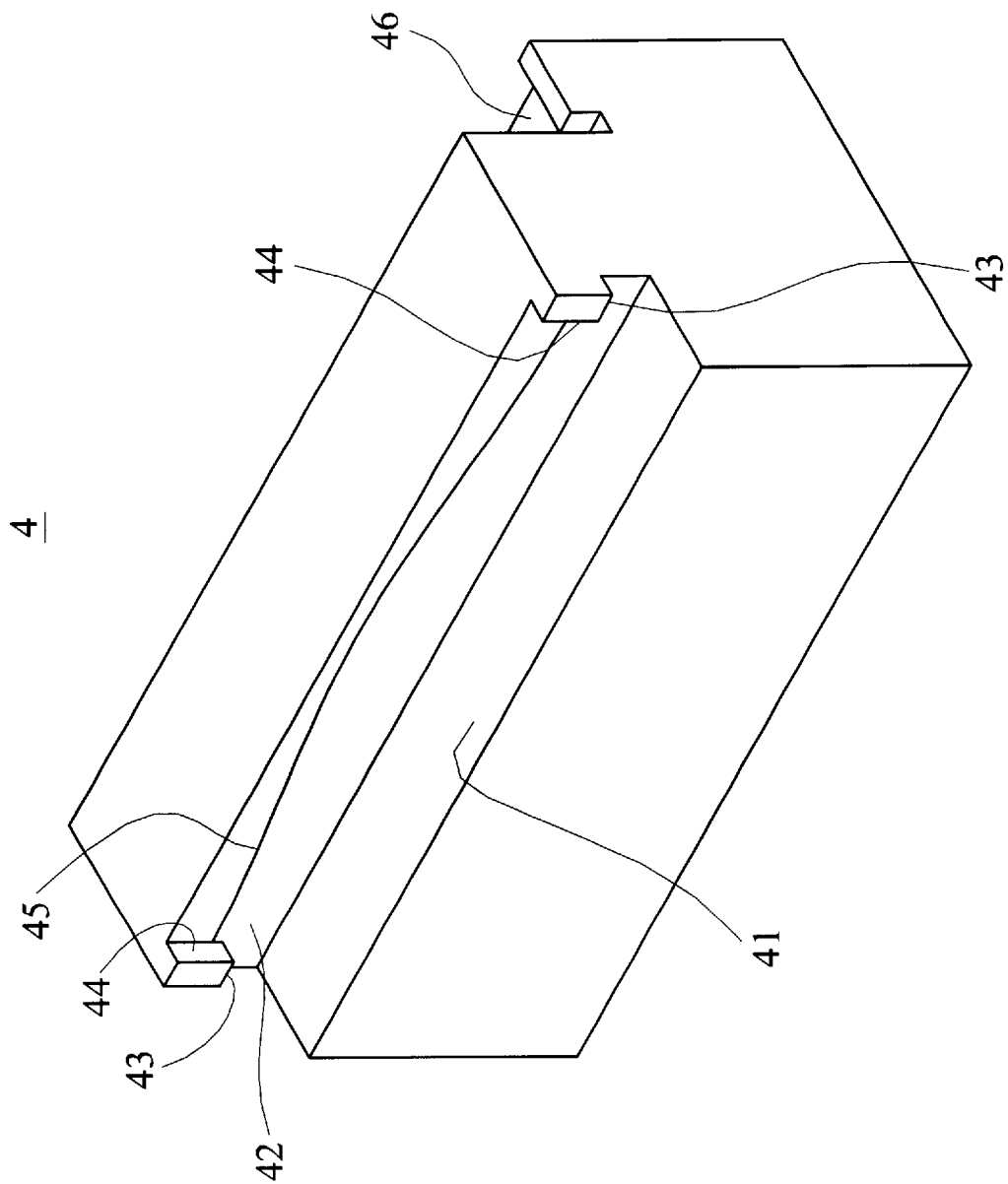
FIGS. 4A and 4B are pictorial views from two different standpoints of the inspection device in accordance with the invention.

Referring to FIG. 4A, an inspection device 4 is formed with a first reference surface 41, a first sidewall surface 42 substantially perpendicular to and connected with the first reference surface 41, two first engagement surfaces 43 connected with and perpendicular to the first sidewall surface 42 and in parallel to the first reference surface 41, two second engagement surfaces 44 each connected with and substantially perpendicular to the first sidewall surface 42 and the adjacent first engagement surface 43, and a first standard curve 45 marked on the first sidewall surface 42.

Figure 4B:
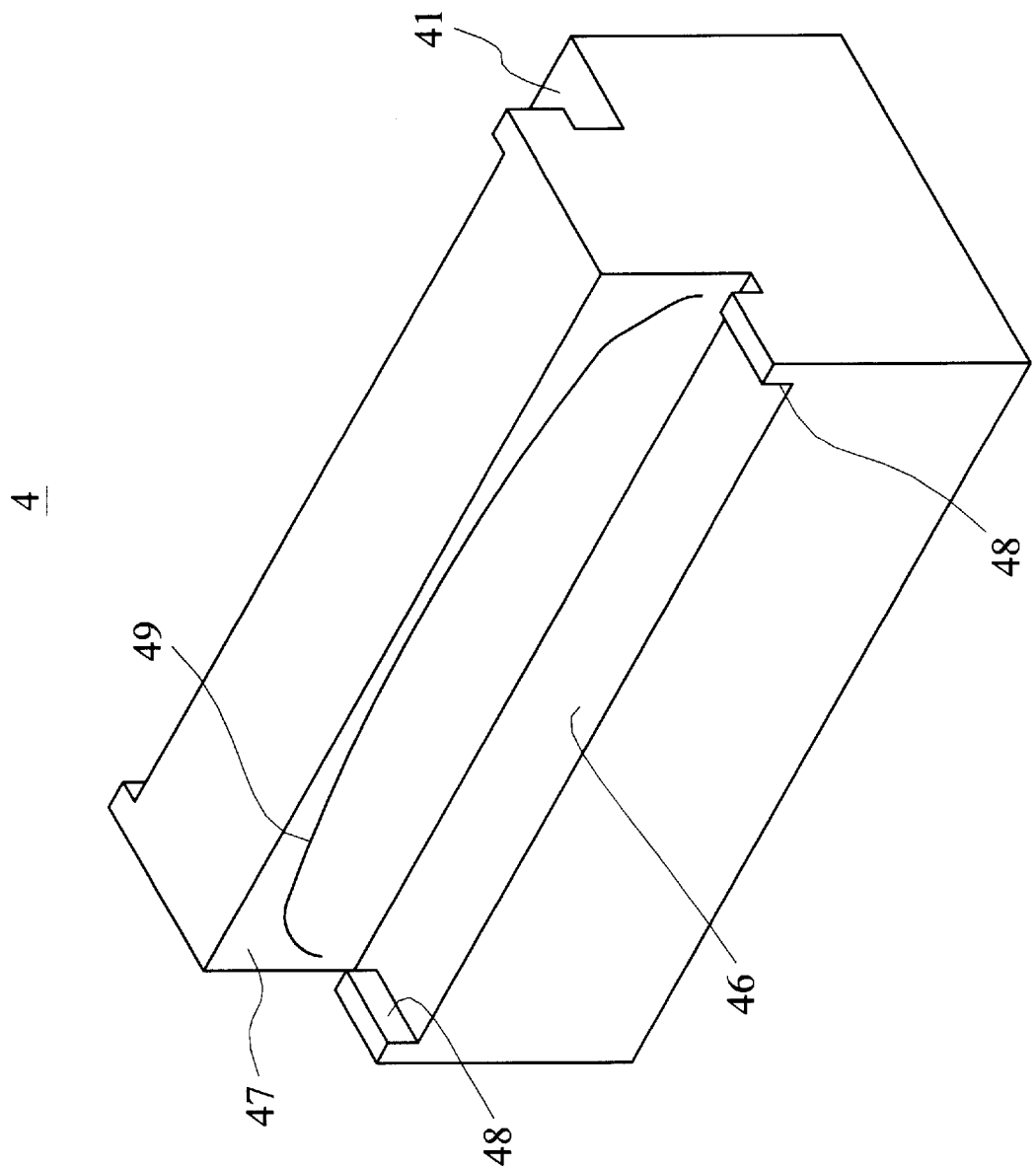

Referring to FIG. 4B, the inspection device 4 is further formed with a second reference surface 46, a second sidewall surface 47 substantially perpendicular to and connected with the second reference surface 46, two third engagement surfaces 48 connected with the second reference surface 46 and substantially perpendicular to the second reference surface 46 and the second sidewall surface 47, and a second standard curve 49 marked on the second sidewall surface 47.

Figure 5A:
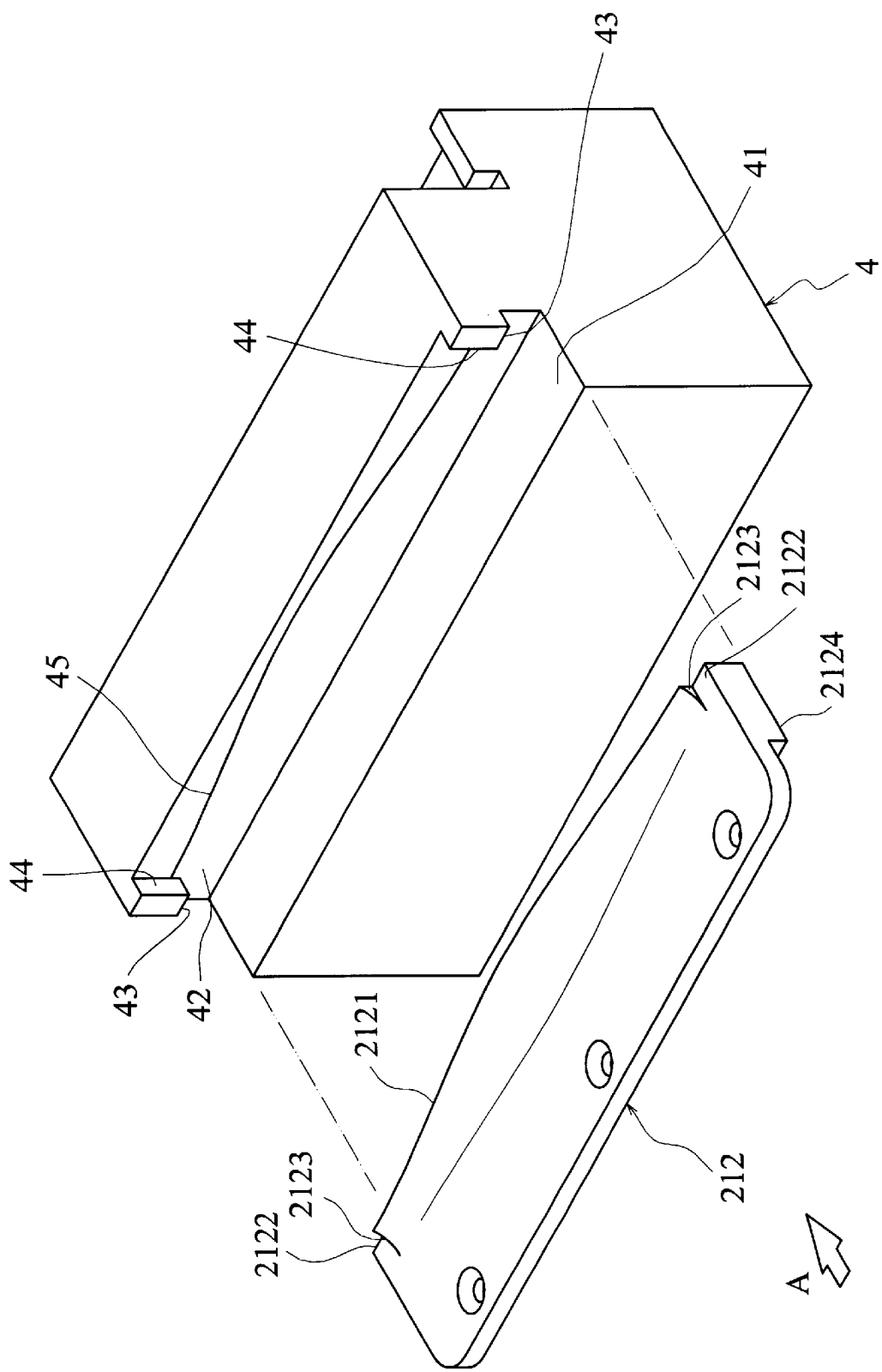
FIG. 5A shows an example of using the inspection device to examine the suppression electrode aperture graphite element in accordance with a preferred embodiment of the invention.

Referring to FIG. 5A, to examine a suppression electrode aperture graphite element 212, let the graphite element 212 be engaged with the inspection device 4 along the direction of arrow A and let the first lower surface 2124 contact the first reference surface 41, the first engagement surfaces 2122 contact the first engagement surfaces 43, the second engagement surfaces 2123 contact the second engagement surfaces 44, and the first to-be-examined curve 2121 contact the first sidewall surface 42. The position of the suppression electrode aperture graphite element 212 for examination, viewed from the direction of the arrow A, is shown in FIG. 5B.

Figure 5B:
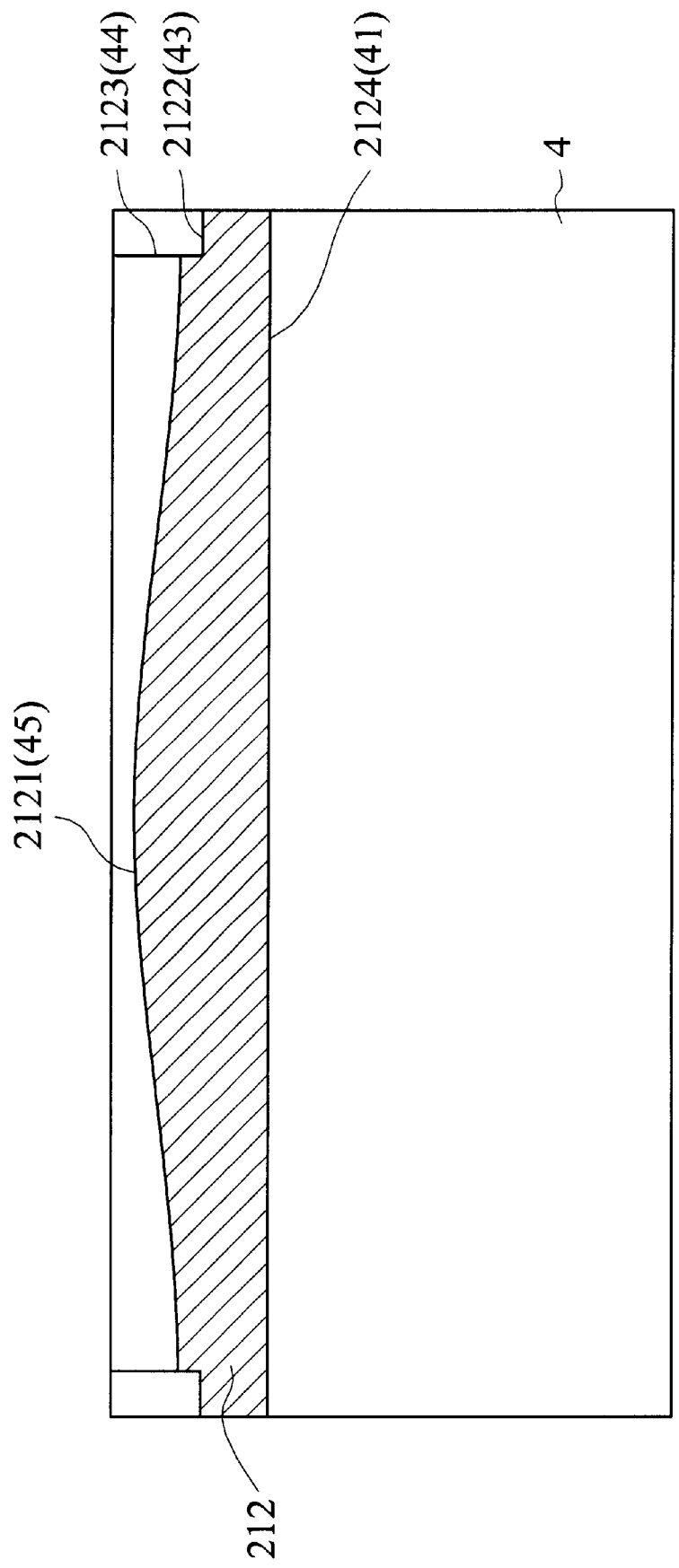
FIG. 5B shows the result of examination as illustrated in FIG. 5A.

Referring to FIG. 5B, the first to-be-examined curve 2121 of the suppression electrode aperture graphite element 212 is not damaged. Under this condition, the first lower surface 2124, the second engagement surfaces 2123, the first engagement surfaces 2122 are respectively in full contact with the first reference surface 41, the second engagement surfaces 44, and the first engagement surfaces 43. The first to-be-examined curve 2121 and the standard curve 45 are superimposed.

Figure 5C:
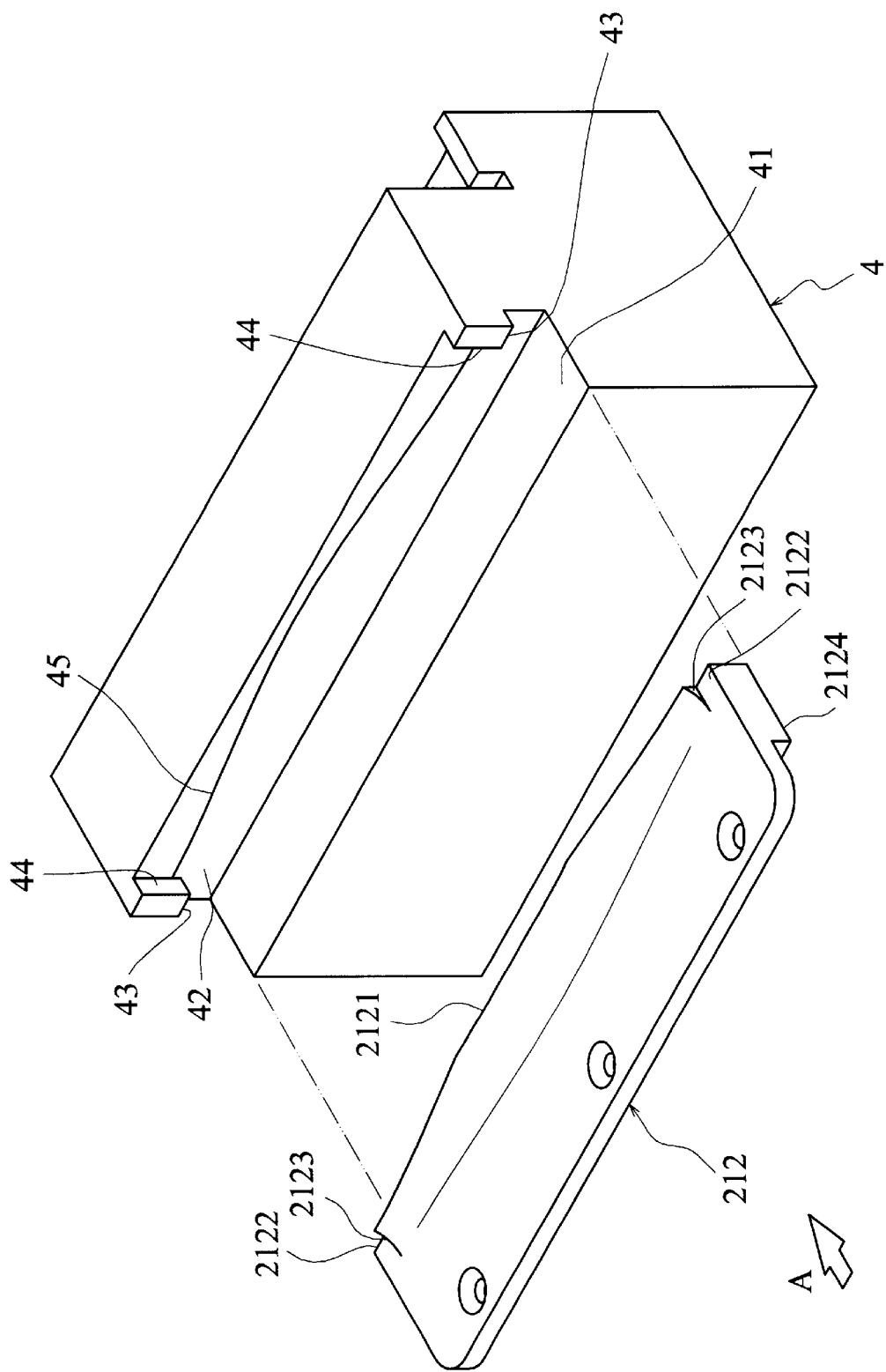
FIG. 5C shows another example of using the inspection device of the invention to examine the suppression electrode aperture graphite element having wear.

Referring to FIG. 5C, the way to engage the suppression electrode aperture graphite element 212 with the inspection device 4 is similar to that as illustrated in FIG. 5A, and a detailed description is omitted. It should be noted that the first to-be-examined curve 2121 of the suppression electrode aperture graphite element 212 is damaged, and examination result is shown in FIG. 5D.

Figure 5D:
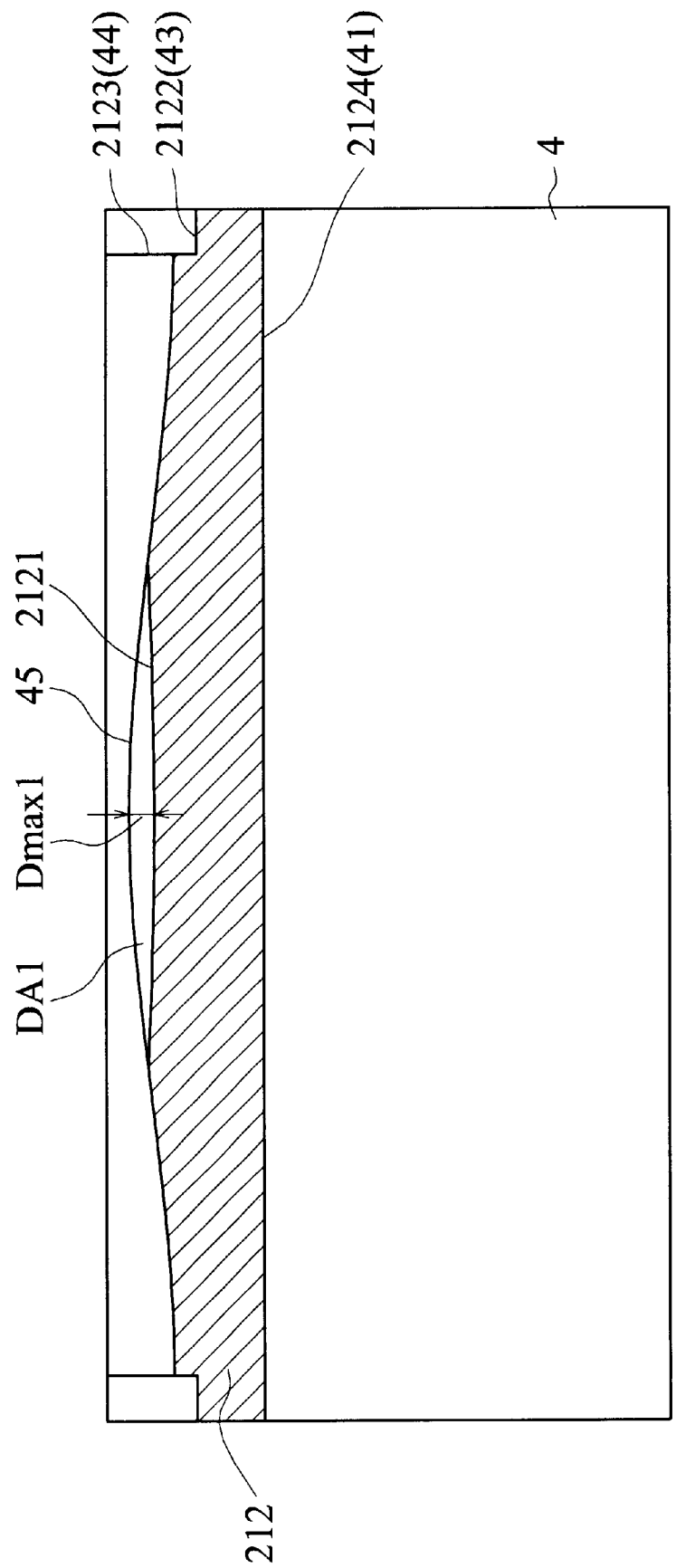
FIG. 5D shows the result of examination as illustrated in FIG. 5C.

Referring to FIG. 5D, under the condition that the first lower surface 2124, the second engagement surfaces 2123, the first engagement surfaces 2122 are respectively in full contact with the first reference surface 41, the second engagement surfaces 44, the first engagement surfaces 43, there is an area difference DA1 between the first to-be-examined curve 2121 and the first standard curve 45, and the maximum distance difference is Dmax1. Based on the area difference DA1 or the maximum distance difference Dmax1, the wear degree of the suppression electrode aperture graphite element 212 can be determined. If Dmax1 is larger than, for example, 0.5 mm, it is determined that the suppression electrode aperture graphite element 212 cannot work normally any more.

Figure 6A:
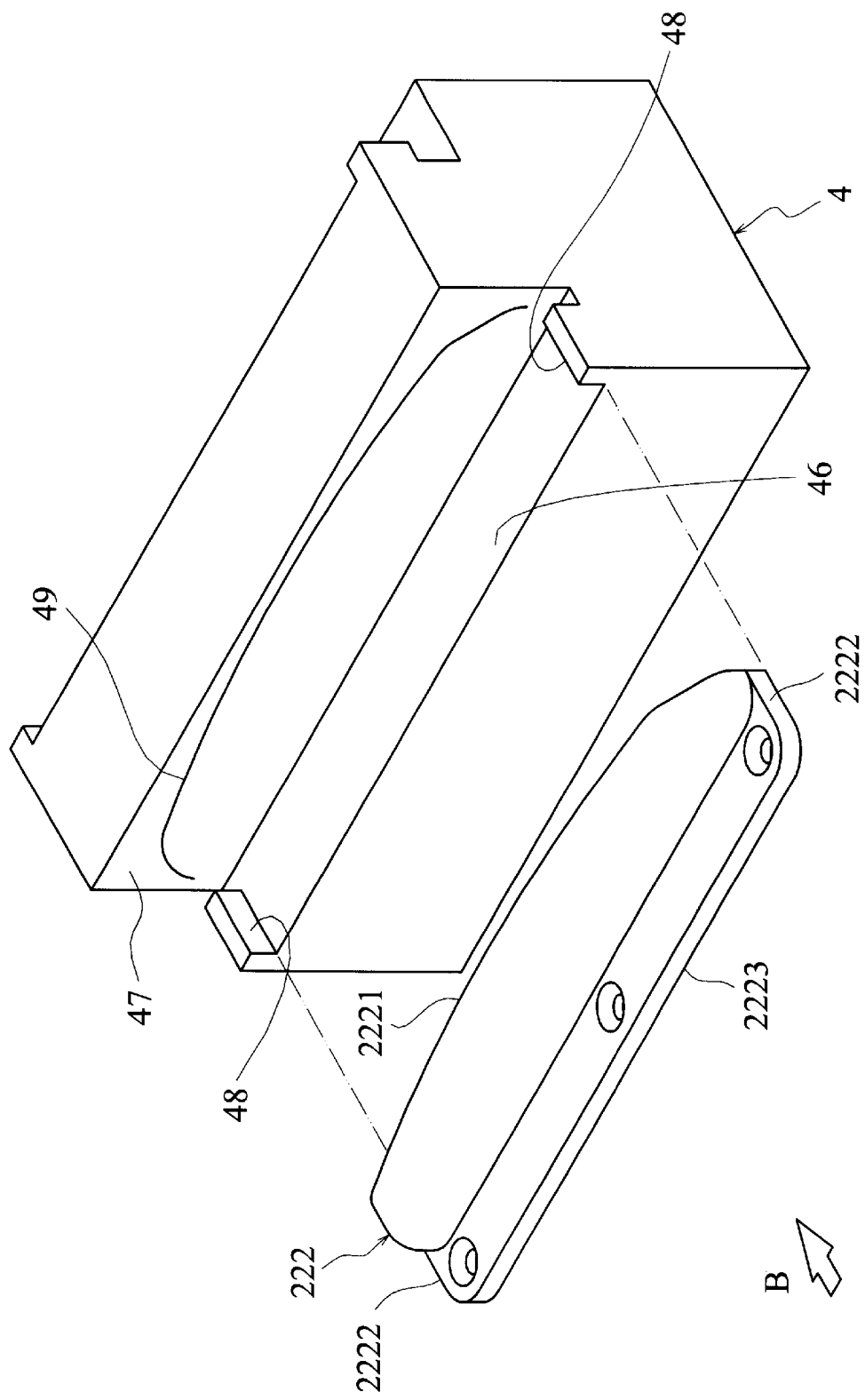
FIG. 6A shows another example of using the inspection device of the invention to examine the suppression electrode aperture graphite element.

Referring to FIG. 6A, to examine the ground electrode aperture graphite element 222, let the graphite element 222 be engaged with the other part of the inspection device 4 along the direction of arrow B and let the second lower surface 2223 contact the second reference surface 46, the third engagement surfaces 2222 contact the third engagement surfaces 48, and the second to-be-examined curve 2221 contact the second sidewall surface 47. The position of the ground electrode aperture graphite element 222 for examination, viewed along the direction of the arrow B, is shown in FIG. 6B.

Figure 6B:
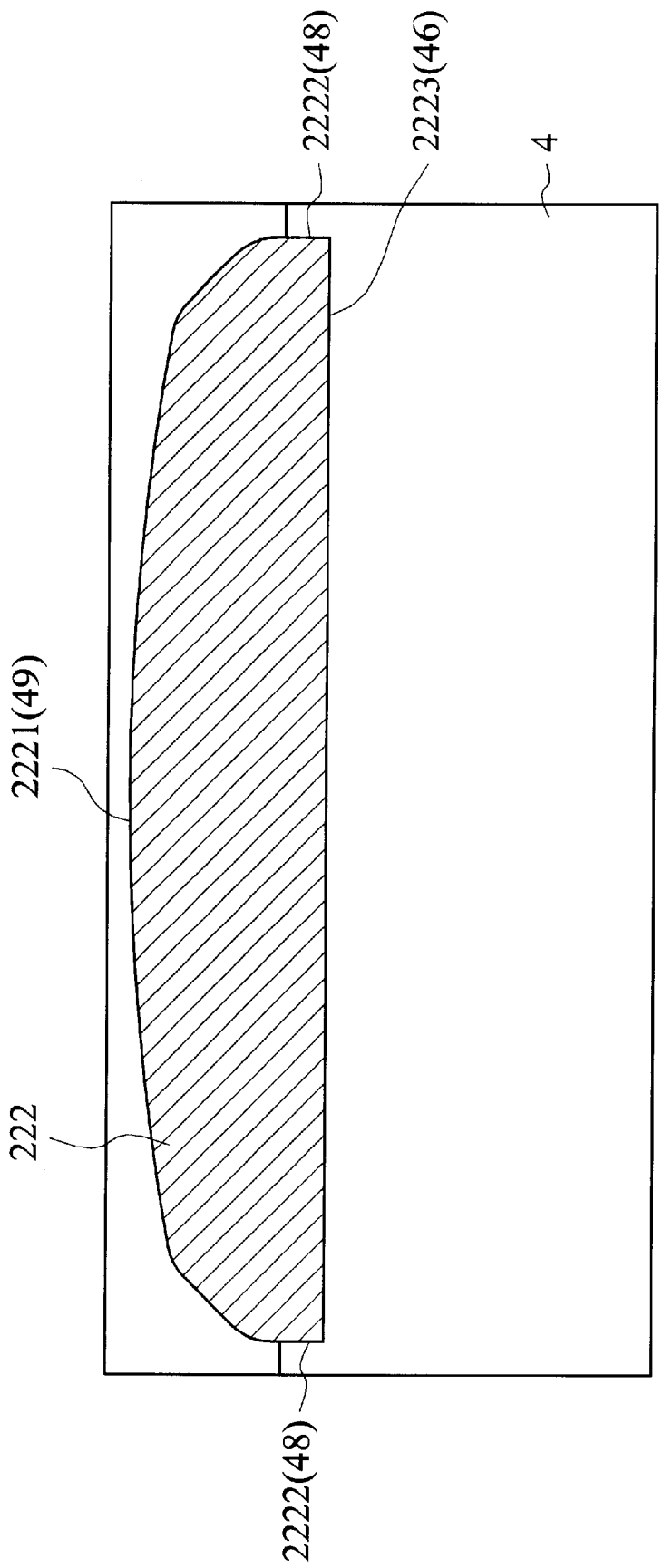
FIG. 6B shows the result of examination as illustrated in FIG. 6A.

Referring to FIG. 6B, the second to-be-examined curve 2221 of the ground electrode aperture graphite element 222 is not damaged. Under this condition, the second lower surfaces 2223 and the third engagement surfaces 2222 are in full contact with the second reference surfaces 46 and the third engagement surfaces 48 respectively. The second to-be-examined curve 2221 is superimposed with the second standard curve 49.

Figure 6C:
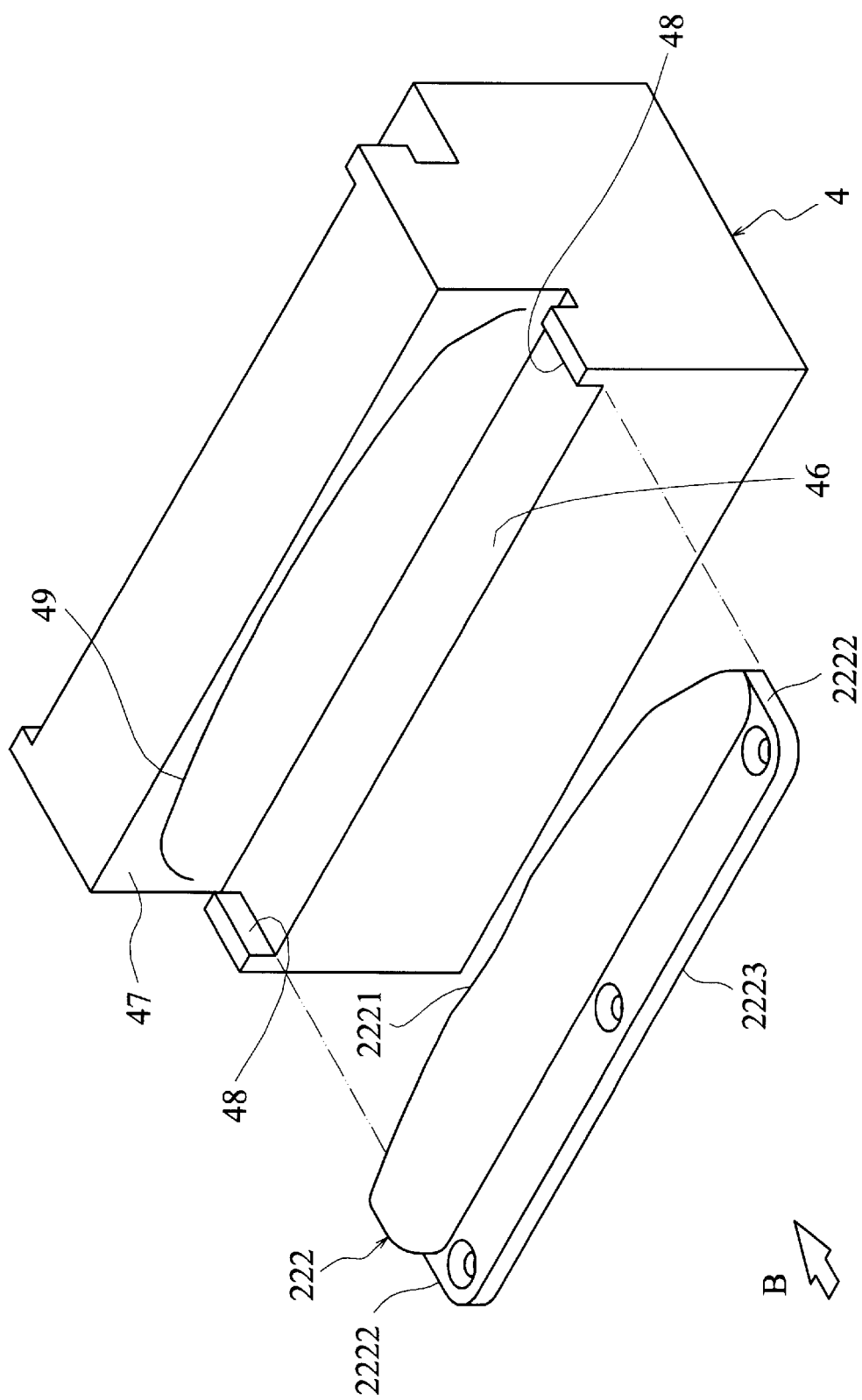
FIG. 6C shows another example of using the inspection device of the present invention to examine the suppression electrode aperture graphite element having wear.

Referring to FIG. 6C, the way to engage the ground electrode aperture graphite element 222 with the inspection device 4 is similar to that as shown in FIG. 6A, and a detailed description is omitted. It should be noted that the second to-be-examined curve 2221 of the ground electrode aperture graphite element 222 is damaged, and the examination result is shown in FIG. 6D.

Figure 6D:
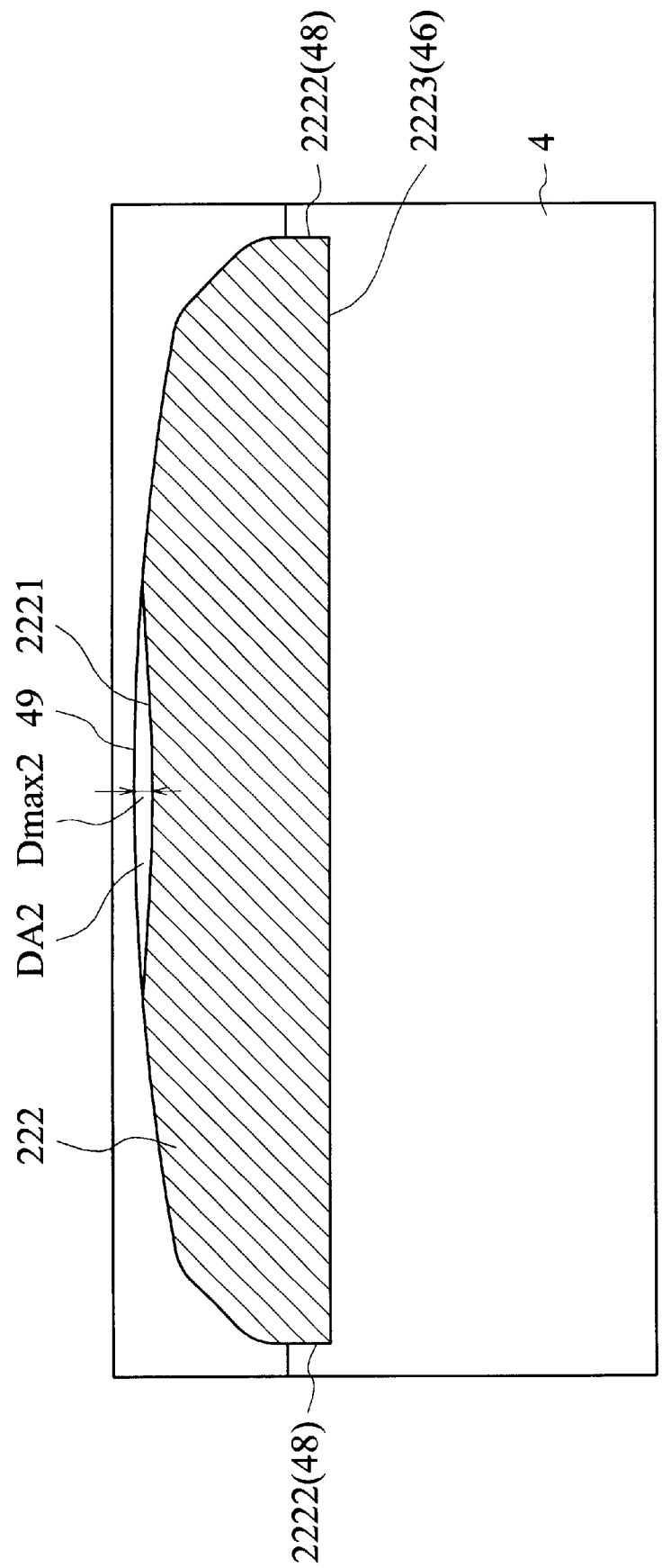
FIG. 6D shows the result of examination as illustrated in FIG. 6C.

Referring to FIG. 6D, under the condition that the second lower surface 2223 and the third engagement surfaces 2222 are in full contact with the second reference surface 46 and the third engagement surfaces 48 respectively, there is an area difference DA2 between the second to-be-examined curve 2221 and the second standard curve 49, and the maximum distance difference is Dmax2. Based on the area difference DA2 or the maximum distance difference, the wear degree of the ground electrode aperture graphite element 222 can be determined. If Dmax2 is larger than, for example, 0.5 mm, it is determined that the suppression electrode aperture graphite element 222 cannot work normally any more.

Thus, as a result of directly examining the to-be-examined curve of the aperture graphite, the time used for examining is saved, and complicated electrical property examination procedures can be avoided.

While the invention has been described by way of example and in terms of a preferred embodiment, it is to be understood that the invention is not limited to the disclosed embodiment. To the contrary, it is intended to cover various modifications. Therefore, the scope of the appended claims should be accorded the broadest interpretation so as to encompass all such modifications. For example, in the above preferred embodiment, the inspection device 4 has the function of simultaneously examining the suppression electrode aperture graphite element 212 and the ground electrode aperture graphite element 222. However, the device 4 can also be designed into two parts for examining these graphite elements 212 and 222 respectively. Furthermore, for the suppression electrode aperture graphite element 212, the first engagement surfaces 2122, the second engagement surfaces 2123, and the first lower surface 2124 can be combined into a to-be-examined engagement portion. Similarly, for the ground electrode aperture graphite element 222, the third engagement surfaces 2222, and the second lower surface 2223 can be combined to form another to-be-examined engagement portion.

Moreover, for the inspection device 4, the first reference surface 41, the first sidewall surface 42, the first engagement surfaces 43, and the second engagement surfaces 44 can be combined to form an examination engagement portion. Similarly, the second reference surface 46, the second sidewall surface 47, and the third engagement surfaces 48 can also be combined to form an examination engagement portion.

Thus, for various types of aperture graphite and the inspection devices, as long as the to-be-examined engagement portion and the examination engagement portion can be engaged with each other, by marking the standard curve on the first sidewall surface 42 or the second sidewall surface 47, examination can be carried out.

What is claimed is:

1. An inspection device in conjunction with a piece of aperture graphite of an extraction electrode, wherein the piece of aperture graphite comprises a to-be-examined curve and a to-be-examined engagement portion, the inspection device comprises at least one sidewall surface having a standard curve marked thereon, the inspection device further comprises at least one examination engagement portion having a predetermined positional relationship with the at least one sidewall surface so that after the to-be-examined engagement portion of the piece of aperture graphite is engaged with the at least one examination engagement portion, and after the to-be-examined curve is projected onto said at least one sidewall surface, an amount of wear of the aperture graphite is clearly visible according to differences between said to-be-examined curve and said standard curve, and the differences between said projected to-be-examined curve and said standard curve comprises an area size difference defined by the area enclosed by said projected to-be-examined curve on said standard curve marked on said at least one sidewall surface, and a maximum distance difference defined by a maximum distance between said projected to-be-examined curve and said standard curve.

2. The inspection device in conjunction with a piece of aperture graphite of an extraction electrode according to claim 1, wherein said aperture graphite is determined as unsuitable for use when the maximum distance difference is larger than 0.5 mm.

3. The inspection device in conjunction with a piece of aperture graphite of an extraction electrode according to claim 1, wherein the aperture graphite comprises a suppression electrode aperture graphite element.

4. The inspection device in conjunction with a piece of aperture graphite of an extraction electrode according to claim 1, wherein the aperture graphite comprises a ground electrode aperture graphite element.

* * * * *